Sept. 21, 1954        A. R. LINDSAY        2,689,765
SILL AND POST STRUCTURE FOR AUTOMOBILE BODIES
Original Filed May 27, 1948
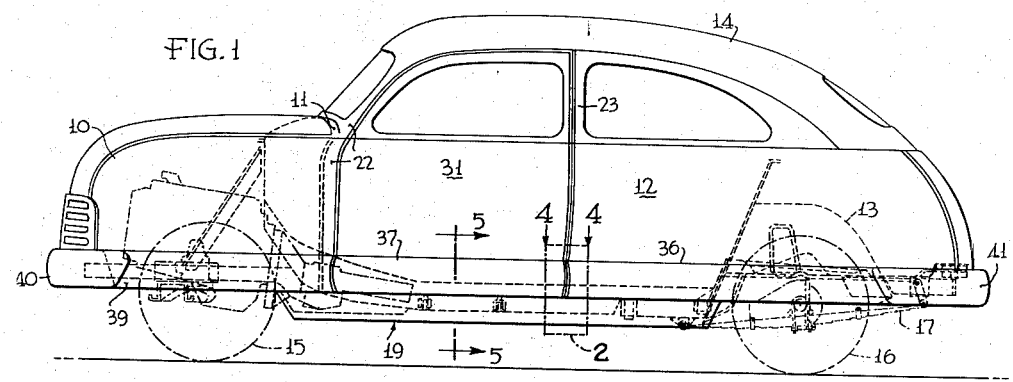
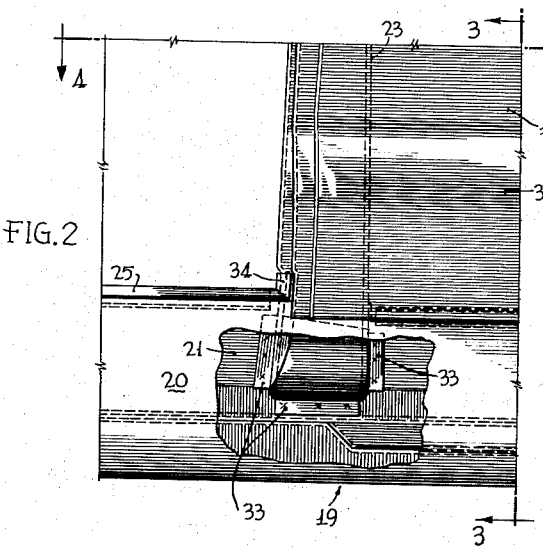
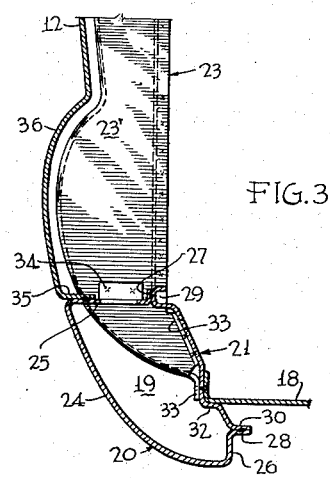
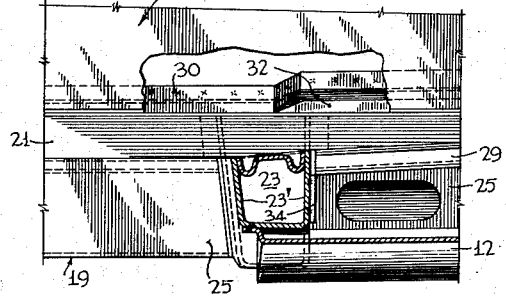
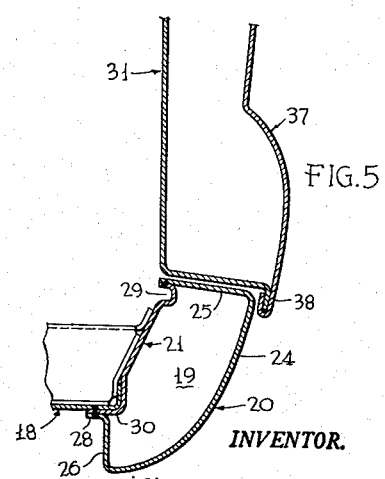
INVENTOR.
Alexander R. Lindsay
BY
Maurice A. Crews
ATTORNEY

Patented Sept. 21, 1954

2,689,765

UNITED STATES PATENT OFFICE 2,689,765

SILL AND POST STRUCTURE FOR AUTOMOBILE BODIES

Alexander R. Lindsay, Detroit, Mich., assignor to The Budd Company, Philadelphia, Pa., a corporation of Pennsylvania Original application May 27, 1948, Serial No. 29,457. Divided and this application November 30, 1950, Serial No. 198,276

5 Claims. (Cl. 296—28)

The invention relates to automobile bodies particularly of the self-supporting or combined chassis and body underframe type.

More particularly, the invention relates to improvements in the structure for private-passenger cars.

Among the objects of the invention is a body which is easy to manufacture, which is strong and durable yet light of weight, in which the stresses from the posts and side panels are effectively transferred into the underframe, and which has a pleasing appearance.

These and other objects and advantages of the invention are achieved by a novel formation and arrangement of parts which will be easily and completely understood from the embodiment described in detail hereinafter and illustrated in the attached drawing.

In the drawing:

Figure 1 is a side elevation of an automobile;

Figure 2 is a larger scale side elevation of the body portion surrounded by line 2 of Figure 1, the outer threshold panel being partly cut away and the door being omitted;

Figure 3 is a fragmentary section along line 3—3 of Figure 2;

Figure 4 is a horizontal fragmentary section on the scale of Figure 3 along lines 4—4 of Figures 1 and 2; and Figure 5 is a fragmentary section on the scale of Figures 2 to 4 through threshold and lower margin of the door taken along line 5—5 of Figure 1.

The automobile diagrammatically illustrated in the drawing is of the type which acts as its own chassis, or in which at least the body underframe and the chassis frame are combined into one single structure. While the invention is mostly concerned with the combined chassis and underframe structure, it is worth mentioning that preferably the upright portions of the body walls, including the front fenders and wheel housings 10, the cowl 11, the rear quarter panels 12, and the rear wheel housings and fenders 13, as well as the roof 14, form an integral structure with the underframe and, together with the latter, serve for sustaining and transmitting all stresses. This unitary structure is supported on the front and rear wheels 15, 16 by means of springs, of which only the rear springs 17 are shown.

This application is a division of the inventor's copending original application: Serial No. 29,457, filed May 27, 1948, Rear End Construction of Self-Supporting Automobile Bodies, now Patent No. 2,662,793, issued December 15, 1953. This application includes certain details also disclosed in the inventor's copending application Serial No. 29,458, Self-Supporting Bodies for Automobiles, filed May 27, 1948. These applications disclose in greater detail and are directed to the structures of the body in the front and rear regions.

Floor panel 18 extends across the width of the body between threshold or side sill structures 19. Structure 19 on each side of the body comprises an outer panel member 20 and an inner member 21 connected along their margins to form a box-section. Sills 19 are connected with the margins of the floor panel 18. The sides of cowl 11 and the rear quarter panels 12 are secured to the tops of the sill members 20 and to the posts 22 and 23.

The side sill or threshold 19 on each side of the body has its outer stamping 20 of inwardly facing channel section provided with merging outer and bottom walls 24, inwardly directed top wall 25, and a narrow lower inner vertical wall extension 26. In the regions of cowl 11 and rear quarter panel 12, the inner margin of wall 25 has an upwardly directed flange 27. The wall extension 26 has an inwardly projecting flange 28 throughout its length. Inner sill member 21 is inserted between the margins of walls 25 and 26 of outer member 20 and has an upper inwardly facing channel portion 29 to the upper wall of which the inner margin of wall 25 is secured in the threshold region (Figure 5), and the vertical wall of which is secured to the vertical flange 27 of wall 25 in the regions of cowl 11 and rear quarter panel 12 (Figure 3). A flange 30 along the lower margin of wall 21 is overlappingly secured to flange 28 of wall extension 26.

In the region of the opening for door 31, floor panel 18 rests on and is secured by spot welding to the overlapping flanges 28 and 30 of the sill, Figure 5. In this region, it is easy to reach through the door opening to effect spot welds. In the region remote from the door opening, such as illustrated in Figure 3, the floor panel rests on and is secured to a ledge 32 of sill member 21 which has its flange 30 in this region offset downwardly below the floor panel. With this arrangement, it is convenient to connect the flanges 28 and 30 in the regions away from the door opening by use of welding tools which do not require reaching into the interior of the body; furthermore, floor panel 18 and inner sill member 21 may be assembled in a first operation to form an underframe unit, and then such unit may be connected with units each comprising a rear quarter panel 12 and an outer threshold or sill member 20.

Through openings in top wall 25 rear or lock pillar 23 extends into the interior of threshold 19 and is secured to wall 21 by flanges 33 bent off from the walls of the pillar. Transverse flanges 34 formed along the margins of the opening in walls 25 overlap the side walls 23' of the pillars and are secured thereto. Pillar 23' is spaced from and not connected to outer wall 24 of the side sill. This has the advantage that the lower end of the pillar and the outer wall of the sill need not be made to exactly the same shape and that the outer wall may be made of a lighter material without the danger of being distorted in use by connections between it and the post. The front pillar connection (not shown) may be similar.

By means of inwardly directed flange 35, rear quarter panel 12 overlaps top wall 25 and is secured thereto.

Panel 12 and door 31 have beadings 36, 37 formed along their lower margins. Overlap flange 38 of the door is outwardly offset relative to the outer surface of sill 19 so that no fitting of the door and sill surfaces is required. Front wheel housing 10 has a similar beading 39. Beadings 36, 37, 39 are arranged in continuation of each other and adjoin the front and rear bumpers 40, 41. This arrangement gives the impression that the car is terminated by the lower horizontal margin of the beadings.

The outer surface of the sill member 24 is inwardly offset with respect to the lower margins of said beadings 36, 37, 39 so that the car gives the impression of being defined at the bottom of the bumpers 40, 41 and said continuous beadings 36, 37, and 39. This inward offsetting also has further advantages. It permits the attachment of the rear quarter panel to the sill by inwardly directed flange 35 of panel 12, an attachment which does not require accurate fairing-in of panel and outer sill surface. Likewise, the lower margin of the door need not be faired in the outer surface of the sill member 20. This fairing-in of adjoining separate body panels is a rather tedious and expensive job, especially in modern bodies with their very slightly curved surfaces. Consequently, the elimination of the necessity for fairing-in panels along one or more margins spells a substantial saving.

In the illustrated embodiment, floor panel 18 is downwardly offset with respect to the top of the side sill or threshold structure 19 so that passengers would have to step over the threshold when entering or leaving the car. This stepping-over is facilitated and the largest possible unobstructed floor space is obtained by the arrangement of threshold or side sill 19 beneath door 31.

The drawings indicate that the illustrated structures consist of sheet metal stampings and that the component sheet metal parts are overlappingly secured to each other by electric spot welding. Also, it is apparent that the margins of the different parts are flanged for this purpose. It is believed not necessary to describe in detail each of these overlapping connections and each of the flanges. While certain parts are described for or shown on only one side of the longitudinal vertical middle plane of the body, the body, in most places, is symmetrical to such plane.

It is to be understood that the invention is subject to modifications and adaptations. For example, the invention or certain features thereof may be employed at the front end of a vehicle.

What is claimed is:

1. In an automobile body, a box-sectional side sill having a first stamping forming the inner upright wall and a second stamping forming the top wall and the outer wall of the sill, a door post extending through an opening in the top wall into the interior of the sill and being secured to the outwardly facing surface of said inner wall while being freely spaced from the outer wall, whereby the lower end of said post and said outer wall may differ in shape, and whereby said second stamping may be of lighter material than said first stamping, without danger of distortion.

2. In an automobile body, a closed box-sectional side sill having upright inner and outer walls interconnected by top and bottom walls, a post at a location remote from the ends of said sill having its lower end inwardly tapered away from said outer wall and extended through an opening in said top wall into the interior of the sill and fastened there by its side and end margins to the outwardly facing surface of said inner wall while being spaced from said outer wall, and a side wall panel secured by one of its end margins to said post and by an inwardly directed flange along its lower margin to said top wall of said sill.

3. In an automobile body, forward and rearward side wall portions flanking a door opening, a door in said opening, a bottom side sill structure, forming a threshold, interconnecting said side wall portions, extending between front and rear wheel locations and having an outer unbroken wall exposed to view in the finished body, said side wall portions being secured to the top of said sill structure by means of in-turned marginal flanges along their lower margins, said side wall portions and said door having their outer surfaces adjoining said sill outwardly offset with respect to the outer surface of said outer wall of the sill structure, the width of said offset being in the order of the thickness of the customary overlap flange of the door and fairing adjoining outer surfaces and the lower margins of said wall portions and said door into each other.

4. An automobile body having on each side: forward and rearward side wall portions flanking a door opening; a door in said opening; a fender longitudinally adjoining at least one of said wall portions and having its lower margin on the level with the lower margin of said wall portions; a bottom side sill and threshold structure extending between front and rear wheel locations, projecting downwardly below said side wall portions, having an outer wall exposed to view in the finished body, and being secured to the lower margins of said side wall structures; a horizontal beading being formed on the lower marginal portions of said wall portions, said door and said wheel housing and being outwardly offset with respect to the outer surface of said outer wall of the sill structure.

5. In an automobile body according to claim 4, having at least at one end a transverse bumper arranged on the level of and blended into said beadings.

References Cited in the file of this patent

UNITED STATES PATENTS

| Number | Name | Date |
|---|---|---|
| 1,143,987 | Nelson | June 22, 1915 |
| 1,525,074 | Heintz | Feb. 3, 1925 |
| 1,983,497 | Henninger | Dec. 4, 1934 |
| 2,012,057 | Swallow | Aug. 20, 1935 |
| 2,102,402 | Zeder | Dec. 14, 1937 |
| 2,389,907 | Helmuth | Nov. 27, 1945 |